United States Patent [19]

Ripert

[11] 4,387,735
[45] Jun. 14, 1983

[54] LINE REMOVABLE VALVE STRUCTURE WITH EXTENSIBLE SEAL RINGS ON PIPELINE SUPPORT STRUCTURE

[75] Inventor: Roger L. Ripert, Concord, Calif.

[73] Assignee: Grove Valve and Regulator Company, Oakland, Calif.

[21] Appl. No.: 348,832

[22] Filed: Feb. 16, 1982

[51] Int. Cl.³ ............................................ F16K 43/00
[52] U.S. Cl. ................................ 137/315; 137/454.2; 251/152; 251/249.5; 251/250
[58] Field of Search .......................... 137/315, 454.2; 251/148, 152, 250, 250.5, 249.5

[56] References Cited

U.S. PATENT DOCUMENTS

| | | | |
|---|---|---|---|
| 1,822,961 | 9/1931 | Emery | 137/315 |
| 1,996,192 | 4/1935 | Daniel | 137/315 |
| 2,994,342 | 8/1961 | Stillwagon | 137/454.2 |
| 3,202,175 | 8/1965 | Dumm | 137/315 |
| 3,371,677 | 3/1968 | Connolly | 137/315 |
| 3,672,632 | 6/1972 | Chow | 137/454.2 |
| 4,079,746 | 3/1978 | Killian | 137/315 |
| 4,311,163 | 1/1982 | Langevin | 137/315 |

OTHER PUBLICATIONS

Resistoflex Corp., "Resistoflex Dynatube Fittings", Circle 057.

Primary Examiner—George L. Walton
Attorney, Agent, or Firm—Melvin R. Stidham

[57] ABSTRACT

A line-removable valve structure wherein a cartridge containing a movable valve closure member and seals is received in a line-support structure including a pair of rigidly interconnected end plates forming line flanges. With the cartridge in place, seat rings threaded in the end plates, are turned to move axially inward to engage and seal against the ends of the cartridge. The seat rings are selectively turned by a worm gear or by hydraulically driven racks meshing with gear teeth around the seat rings.

7 Claims, 3 Drawing Figures

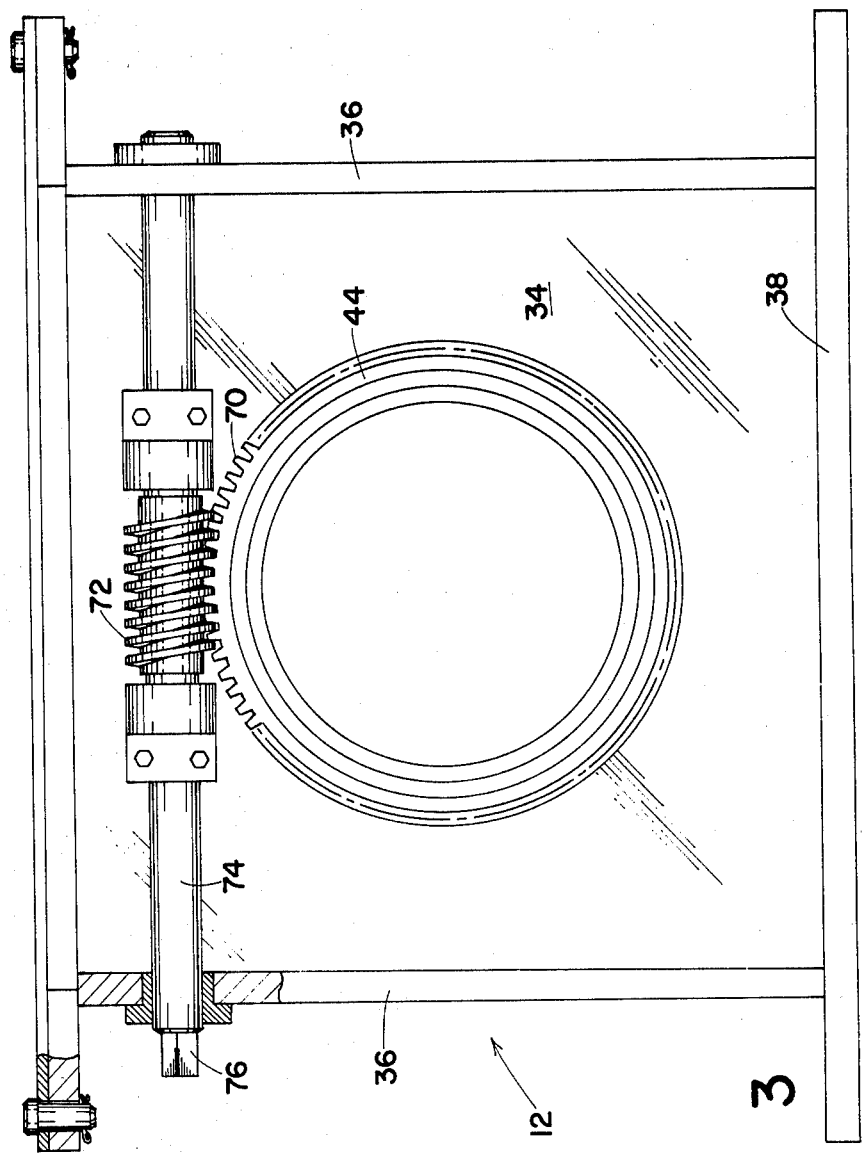

LINE REMOVABLE VALVE STRUCTURE WITH EXTENSIBLE SEAL RINGS ON PIPELINE SUPPORT STRUCTURE

BACKGROUND OF THE INVENTION

Particularly in undersea pipeline installations, it is highly desirable to be able to remove a pipeline valve, or its internal components, for purposes of repairing and replacing same while continuing to support the pipeline during the removal and replacement operation.

Some have suggested the provision of top-entry valves wherein access to the valve internal components is gained by removal of a top closure. However, the repair of such valves requires a number of mechanical manipulations, such as the removal and replacement of the bolts, the main valve member and the seat ring assemblies, and such operations are not ideally performed on the ocean floor, where maneuverability and mechanical leverage are impaired and visibility is generally poor. Moreover, a part dropped in the silt and vegetation of the ocean floor may not be easily found.

There are commercially available valves of the expansible tube type, wherein a cartridge containing all of the operating parts of the valve is clamped between two line flanges which, in turn, are interconnected by threaded studs. Such a valve is shown in Connolly U.S. Pat. No. 3,371,677 granted Mar. 5, 1968. In order to remove the cartridge there shown from between the line flanges, the studs across the top are removed and the nuts on the remaining studs are loosened. Jacking nuts are provided on at least some of the remaining studs on the inboard side of the flanges so that they can be threaded outward to jack the line flanges apart for removal of the valve cartridge. However, in undersea operations, the seas, tides and shifting sands impose many additional forces on the pipeline which, with the removal of studs between the line flanges, could impose severe stresses on the remaining studs and prevent proper realignment when the valve cartridge is replaced. Moreover, a diver in underseas operation may not have sufficient leverage to remove the necessary nuts and to tighten the jacking nuts with sufficient force, and even if successful, the studs and nuts removed from the valve for purposes of valve cartridge replacement, are easily lost in the silt, sands and vegetation on the ocean floor where visibility is something less than ideal.

OBJECTS OF THE INVENTION

It is an object of this invention to provde a pipeline valve, the principal components of which may be removed from the line while other members continue to support and maintain the integrity of the pipeline.

It is a further object of this invention to provide a removable ball valve for undersea service which can be removed and replaced in a minimum amount of time with a minimum number of tools.

It is a further object of this invention to provide an undersea pipeline valve wherein a valve cartridge can be removed without requiring removal of nuts, bolts or the like.

It is a further object of this invention to provide an undersea pipeline valve which can be removed from the line within the limits of operating leverage imposed on the diver under low gravity conditions.

Other objects and advantages of this invention will become apparent from the description to follow, particularly when read in conjunction with the accompanying drawings.

SUMMARY OF THE INVENTION

The valve cartridge comprises a cylindrical body band containing the main valve closure and seal rings, to which are bolted end closures with flow passageways therethrough. The cartridge is received in a pipeline support box comprising two parallel, opposing thick steel end plates with complementary flow passages aligned with those in the valve cartridge, and side and bottom plates, all welded together to form a rigid, unitary structure. The end plates carry hubs or other means to install the support box or enclosure in a pipeline. When the valve cartridge is placed in the enclosure, seal ring assemblies in the end plates of the pipeline support box are extended axially to seal against the thick end closures of the valve cartridge. In order to remove the valve cartridge from the enclosure, the seal ring carriers are retracted.

BRIEF DESCRIPTION OF THE DRAWINGS

In the drawings:

FIG. 3 is an enlarged partial section view of a pipeline support box with another embodiment of means for activating the seal assembly.

DESCRIPTION OF PREFERRED EMBODIMENTS

Figure 1:
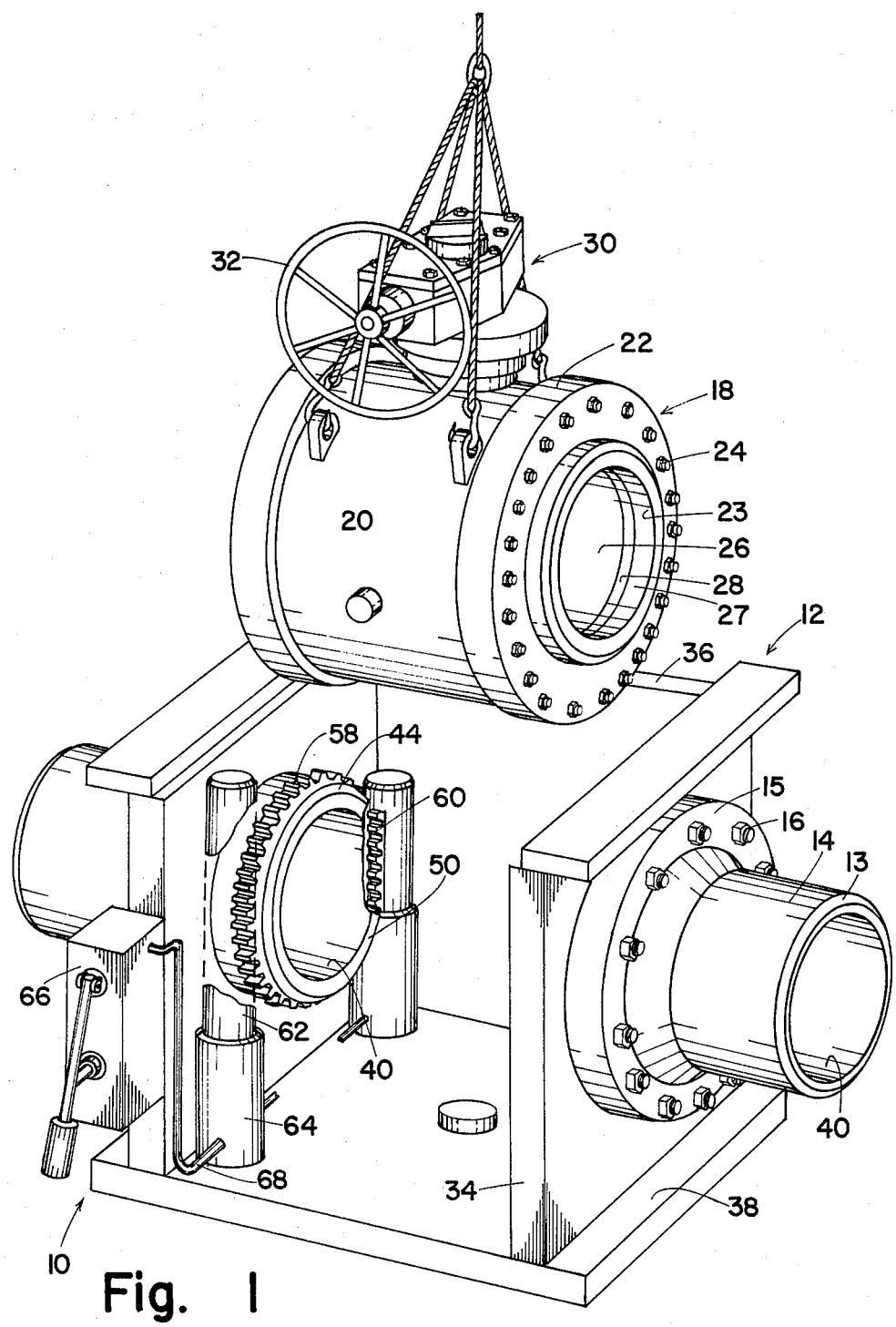
FIG. 1 is a view in perspective showing one embodiment of the pipeline support box with the valve cartridge removed and suspended above it.
Figure 2:
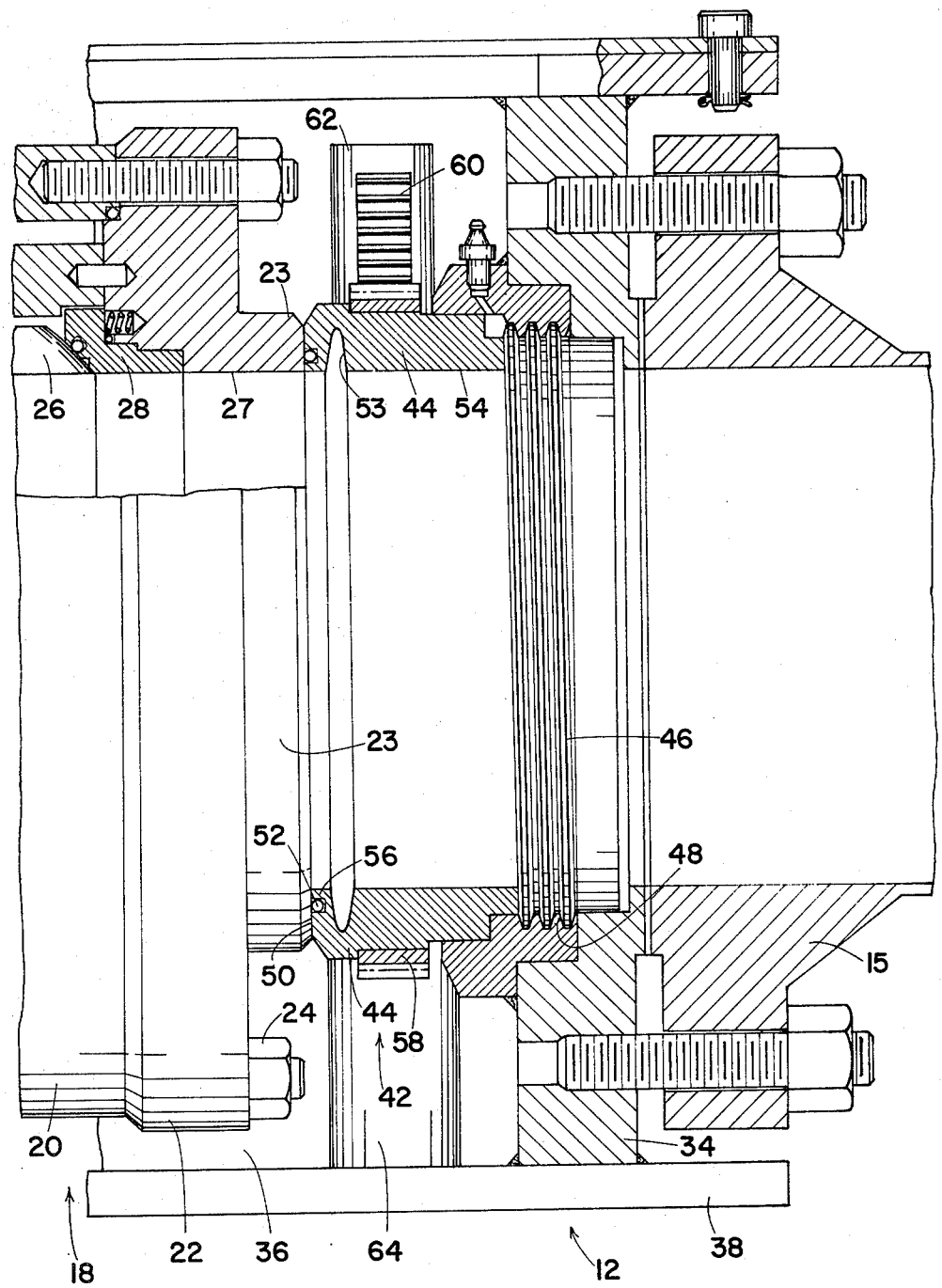
FIG. 2 is an enlarged partial section view of the pipeline support box and a seal assembly thereon.

The Embodiment of FIGS. 1 and 2

Referring now to the FIG. 1 with greater particularity, the undersea line-removable pipeline valve assembly 10 of this invention includes a pipeline support box 12, which is permanently secured to the underwater pipeline (not shown) as by welding around the ends 13 of cylindrical hubs 14 with flanges 15, which are secured to the pipeline support box by means of bolts 16. Received in the pipeline support box 12 is the valve module or cartridge 18, which includes a valve body 20, and thick steel plate end closures 22 with protruding annular bosses 23 thereon, secured to the body by studs 24. Also included in the valve cartridge 18 is the main valve closure member 26, such as a rotatable ball or plug seen through a flow passage 27 in FIG. 1, and a suitable seat ring assembly 28 for sealing between the valve body 20 and the valve closure member 26 (FIG. 2). Any suitable valve operating means, such as a scotch yoke operator 30 with a hand wheel 32, may be mounted on the valve for opening and closing.

The pipeline support box 12 comprises a pair of parallel, thick steel end plates 34 to which are welded side and bottom plates 36 and 38 to form a unitary, rigid structure which will support the pipeline and maintain the end plates 34 and hubs 14 in axial alignment, even with the cartridge 18 removed. Complementary flow passages 40 are provided in the thick end plates 34 for axial alignment with those 27 in the valve cartridge end plates 22.

Referring now to FIG. 2, the seal assembly 42 between the valve cartridge 18 and the pipeline support box end plate 34, is shown in greater detail. As there shown, a rigid seat ring 44 is carried on each thick end plate 34 for axial threaded movement thereon. Hence, when the seat ring 44 is turned, external threads 46 thereon move along complementary internal threads 48 in the pipeline support box end plate 34 to move the front face 50 of the seat ring 44 into and out of engagement with the boss 23 on the end closure 22 of the valve cartridge 18. A resilient seal ring 52 such as an O-ring may be carried on the front face 50 of the seat ring for fluid-tight sealing. In addition, a deep groove 53 may be formed around the internal cylindrical surface 54 of the seat ring 44 leaving a cantilevered radial, annular extension 56 at the leading end of the seat ring 44 for better, yieldable seating. Further, the groove 53 is of a diameter greater than that of the main seal ring 53, so that, with line pressure acting against the inner surface of the groove 53 to its full depth, there is a total force biasing the annular extension 56 against the annular boss 23 in the cartridge 18. This is opposed by the same line pressure acting against just that area, which is circumscribed by the seal ring 52. As a result, there is a net sealing force or "piston action" biasing the annular extension 56 against the annular boss 23.

One embodiment of means for threading the seat ring for such axial movement comprises a gear ring 58 carried at least partly around the seat ring 44 to be driven by complementary gear means on the pipeline support box 12. As shown in FIG. 2, this may take the form of a pair of racks 60, which engage the gear 58 at diametrically opposite sides thereof. The racks 60 may be carried on hydraulic rams 62, which are slidable in cylinders 64 mounted on the pipeline support box 12 (FIG. 1).

Hydraulic pressure for the rams 62 may be provided by a manual hydraulic pump 66 with integral reservoir connected at 68 to the pressure side of the rams so that when one ram 62 is pressurized to force its rack 60 upward to turn the seat ring 44 in the appropriate direction, the other ram is relieved to be driven downward by the ring gear 58 engaging its rack 60.

The Embodiment of FIG. 3

Here, the gear teeth 70, which are carried on the seat ring 44, are driven by a worm gear 72, which is carried on a shaft 74 rotatably mounted in the side walls 36 of the pipeline support box 12. Hence, by placing a suitable wrench or crank (not shown) on one end 76 of the shaft 74 the shaft may be rotated to thread the seat 44 along, as previously described, and effect the seal with the boss 22 on the valve cartridge end closure 22 (FIG. 2).

While this invention has been described in conjunction with preferred embodiments thereof, it is obvious that further modifications and changes therein may be made by those skilled in the art to which it pertains without departing from the spirit and scope of this invention, as defined by the claims appended hereto.

What is claimed as invention is:
1. In a line-removable valve structure comprising:
a pipeline-support structure; and
a valve cartridge received in said structure;
said valve cartridge including:
a body containing a movable valve closure member and end closures with flow openings therein;
said support structure comprising:
a pair of opposing end plates with flow passageways therethrough;
means on the outboard sides of said end plates for connection thereof into a pipeline; and
rigid steel side members interconnecting said end plates;
means for sealing said valve cartridge between said end plates comprising:
a support structure seat ring carried on the inner surface of an end plate;
annular sealing means around the inwardly directed annular face of said seat ring;
an opposing sealing surface on one of said cartridge end closures around a flow opening;
complementary thread means on said seat ring and said end plate to move said seat ring along the axis of said flow passageway upon turning said seat ring through a rotational increment;
selectively operable means for producing said rotational increment of said seat ring, said selectively operable means including:
gear teeth at least partially around said seat ring; and
complementary gear teeth on said support structure for movement thereon so as to enable removal of said valve cartridge.
2. The combination defined by claim 1 including:
means forming a deep groove around the internal cylindrical surface of said seat ring adjacent said inwardly directed annular face so that said annular face is on a yieldable, radial cantilever portion of said seat ring;
an annular recess around said inwardly directed annular face; and
a resilient seal ring carried in said recess;
the diameter of the bottom of said deep groove bein greater than the diameter of said recess.
3. The combination defined by claim 1 wherein:
said complementary gear teeth are on a first rack removable longitudinally on said support structure; and including:
selectively activated first drive means for moving said first rack.
4. The combination defined by claim 3 including:
a second rack engaging said gear teeth on the diametrically opposite side of said seat ring and being carried on said support structure of longitudinal movement thereon; and
selectively activated second drive means for moving said rack longitudinally.
5. The combination defined by claim 4 wherein:
when one of said drive means is activated to rotate said seat ring the other of said drive means is inactivated to be driven thereby.
6. The combination defined by claim 5 wherein:
said drive means include at least one hydraulic ram.
7. The combination defined by claim 1 including:
a shaft rotatably mounted on said support structure;
a worm gear on said shaft forming said complementary gear teeth.

* * * * *